(12) United States Patent
Lin

(10) Patent No.: US 9,453,591 B1
(45) Date of Patent: Sep. 27, 2016

(54) NAIL CLAMP FOR A CONNECTING STRUCTURE

(71) Applicant: NAILERMATE ENTERPRISE CORPORATION, Taichung (TW)

(72) Inventor: Wen-Pin Lin, Taichung (TW)

(73) Assignee: NAILERMATE ENTERPRISE CORPORATION, Taichung (TW)

( * ) Notice: Subject to any disclaimer, the term of this patent is extended or adjusted under 35 U.S.C. 154(b) by 8 days.

(21) Appl. No.: 14/644,207

(22) Filed: Mar. 11, 2015

(51) Int. Cl.
*F16B 15/00* (2006.01)
*F16L 3/04* (2006.01)
*F16L 3/06* (2006.01)
*F16M 13/02* (2006.01)

(52) U.S. Cl.
CPC .. *F16L 3/04* (2013.01); *F16L 3/06* (2013.01); *F16M 13/02* (2013.01)

(58) Field of Classification Search
CPC ........... F16L 3/123; F16L 3/222; F16L 3/04; F16L 3/1226; F16L 3/2235; F16L 3/06; H02G 3/32; H02G 3/26; F16B 15/00; F16M 13/02
USPC ...... 248/71.73; 24/457, 458; 174/135, 72 A, 174/40 CC
See application file for complete search history.

(56) References Cited

U.S. PATENT DOCUMENTS

| 4,801,064 A * | 1/1989 | Mangone, Jr. | F16L 3/04 227/120 |
| 4,903,920 A * | 2/1990 | Merritt | F16L 3/04 24/457 |
| 7,622,682 B2 * | 11/2009 | Malin | H02G 3/32 174/135 |
| 2007/0175653 A1 | 8/2007 | Malin | |

FOREIGN PATENT DOCUMENTS

| AU | 585389 B | 10/1989 |
| EP | 0204301 A2 | 12/1986 |
| GB | 2483957 B | 3/2012 |
| GB | 2500403 A | 3/2012 |
| WO | 2005/052427 A1 | 9/2005 |

* cited by examiner

*Primary Examiner* — Todd M Epps
(74) *Attorney, Agent, or Firm* — Bruce Stone LLP; Joseph A. Bruce

(57) ABSTRACT

A nail clamp includes a clamp body and a nail, the clamp body includes a first side which is provided with a rib extending in a direction X, and a second side which is provided with an engaging groove, the engaging groove includes an opening end located at the closed end of the clamp portion, and a bottom end located between the closed end and the open end of the clamp body, the rib of one nail clamp is inserted into the engaging groove of another nail clamp, so that two nail clamps are connected into a nail clamp strip in a stepped manner. When the nail is being fired, the nail is slantingly position relative to the nailing surface to avoid the walls surrounding the nail clamp, thus allowing the nail gun to conveniently fix the nail clamp to the nailing surface in corners.

7 Claims, 8 Drawing Sheets

NAIL CLAMP FOR A CONNECTING STRUCTURE

BACKGROUND OF THE INVENTION

1. Field of the Invention

The present invention relates to a nail clamp for fixing a cylindrical object, and more particularly to a connecting structure for a nail clamp.

2. Description of the Prior Art

As shown in FIG. 1, a conventional nail clamp is used to fix a cylindrical object with a diameter, such as wire, cable, pipe or rod, and essentially comprises: a plastic clamp body 10 and a nail A. The clamp body 10 includes a U-shaped clamp portion 11 and a nail insertion portion 12 with an insertion hole 121. The clamp portion 11 defines a U-shaped space 111 for holding a cylindrical object M, then the nail A is inserted through the insertion hole 121 of the nail insertion portion 12 to fix the cylindrical object M to the ground or a wall.

Currently, the nail for fixing the nail clamp can be fired manually by a hammer or automatically by a nail gun. It is to be noted that, when the nail A is being pushed into the ground or the nailing surface of a wall where the nail clamp is to be fixed, the nailing force for pushing the nail A should be applied in a direction which is perpendicular to the head of the nail A and parallel to the clamp body 10, so as to prevent slantingly pushing of the nail and drift of the clamp body 10. However, as shown in FIG. 1, the nail A is normally perpendicular to the wall when being pushed, and the cylindrical object M is normally arranged along corners, so that the force-applying direction of the hammer or nail gun is very likely to be restricted by the walls surrounding the nail clamp, causing inconvenience in fixing the nail clamp in the corners.

The present invention has arisen to mitigate and/or obviate the afore-described disadvantages.

SUMMARY OF THE INVENTION

According to a first aspect of the present invention there is provided a connecting structure for a nail clamp as claimed in claim 1.

According to a second aspect of the present invention there is provided a method as claimed in claim 8.

DETAILED DESCRIPTION OF THE PREFERRED EMBODIMENT

Figure 1:
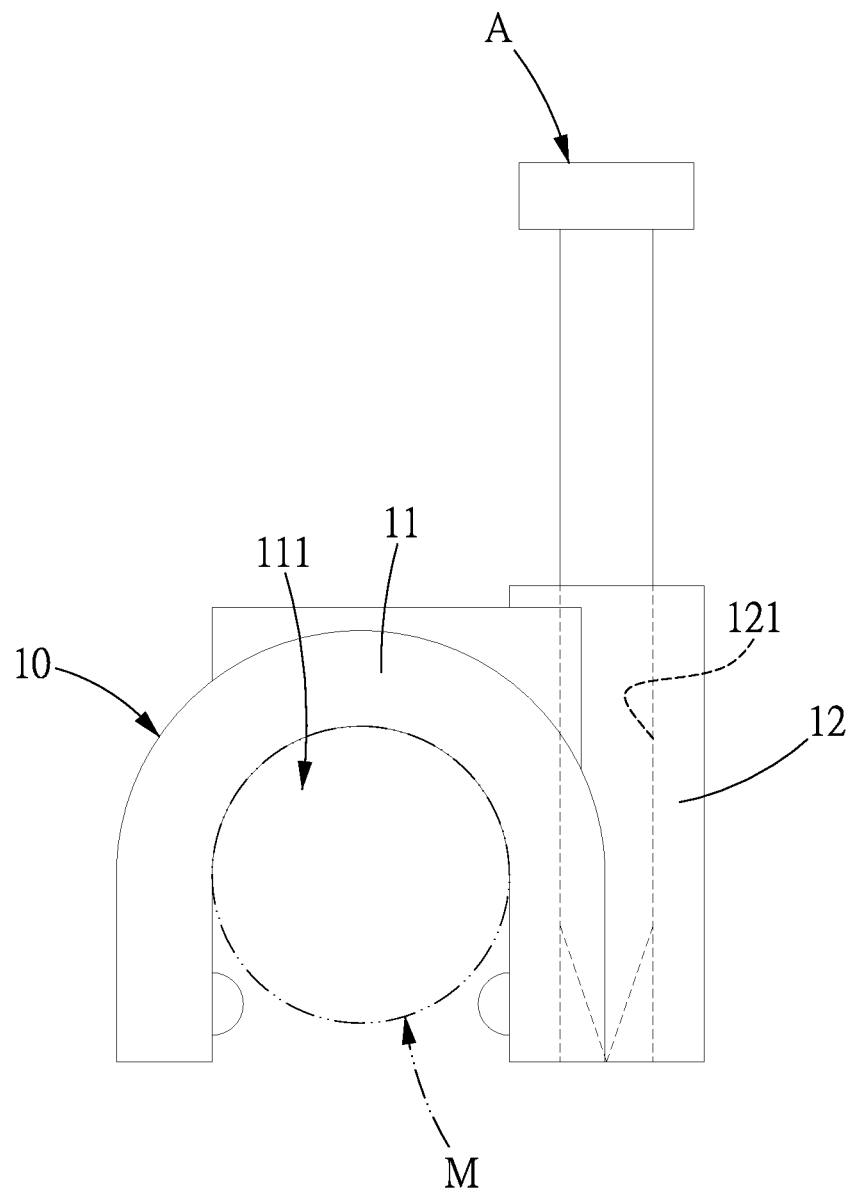
FIG. 1 shows that a conventional nail clamp used to fix a cylindrical object.

The present invention will be clearer from the following description when viewed together with the accompanying drawings, which show, for purpose of illustrations only, the preferred embodiment in accordance with the present invention.

Referring to FIGS. 2-8, a nail clamp in accordance with the present invention is used to fix a cylindrical object to a wall S. The nail clamp includes a clamp body 20 and a nail 30. The clamp body 20 includes a U-shaped clamp portion 21 and an insertion portion 22 with an insertion hole 221 penetrating the insertion portion 22. A lengthwise direction of the insertion hole 221 of the insertion portion 22 is defined as a direction X, and the clamp portion 21 includes a closed end 211 and an open end 212 located in the direction X.

Figure 2:
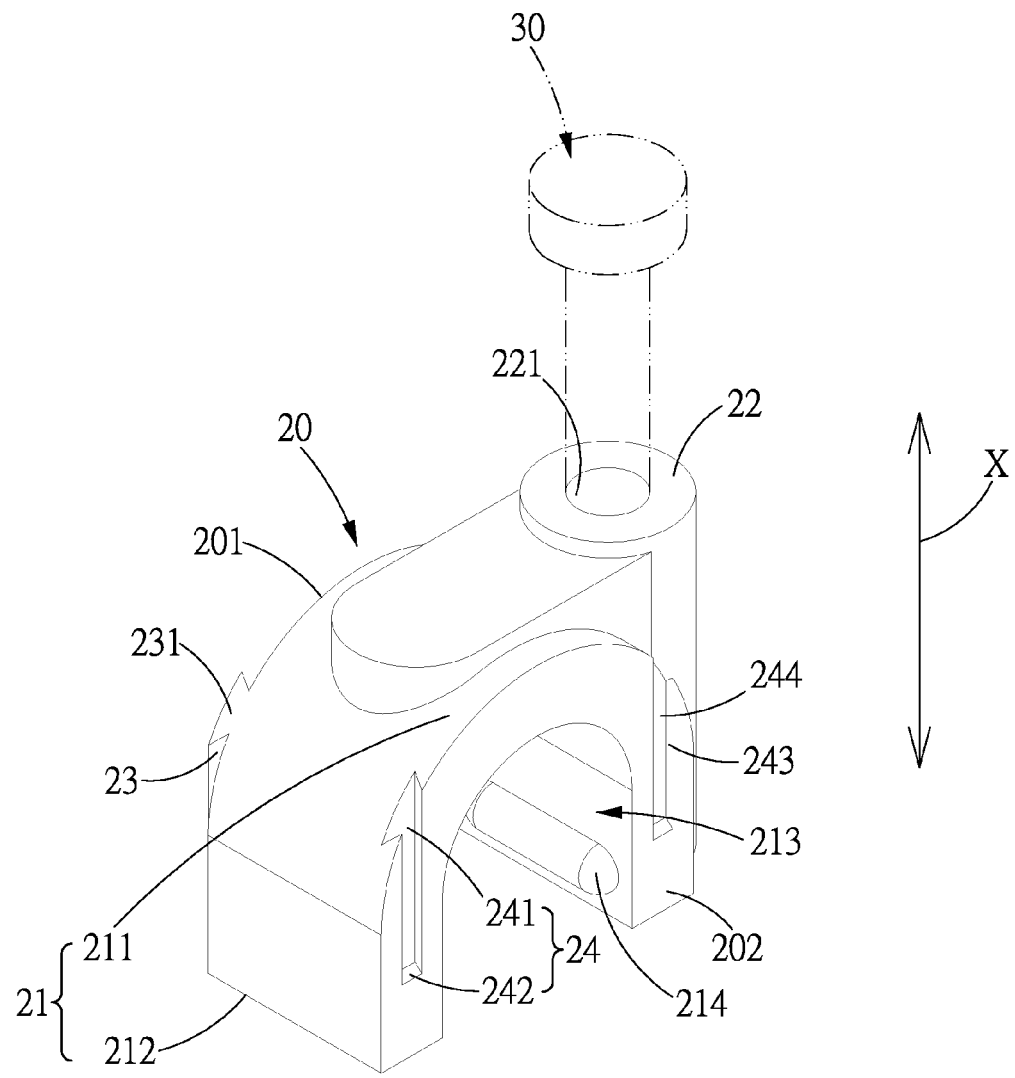
FIG. 2 shows a nail clamp in accordance with the present invention.
Figure 3:
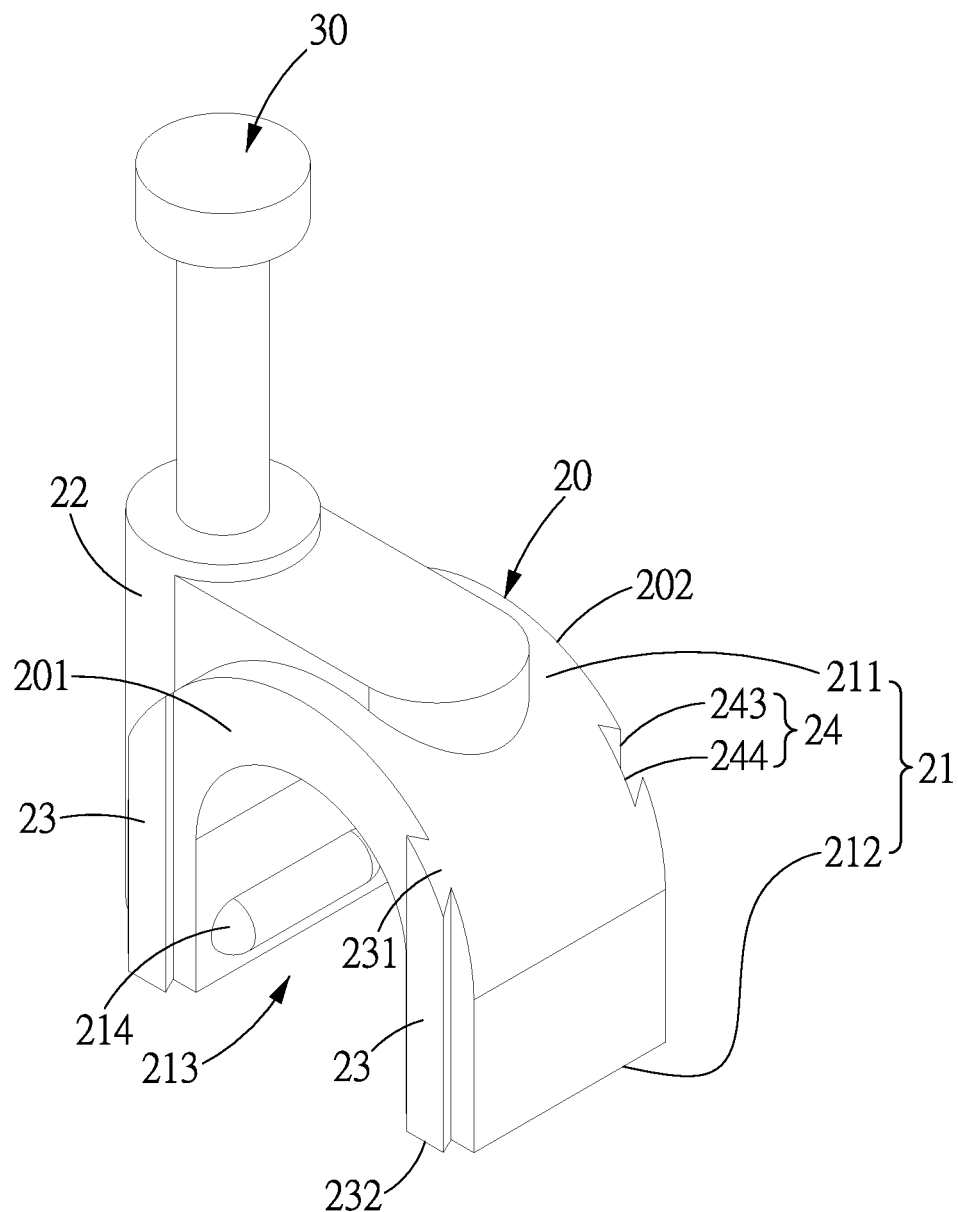
FIG. 3 shows another side of the nail clamp of FIG. 2.
Figure 4:
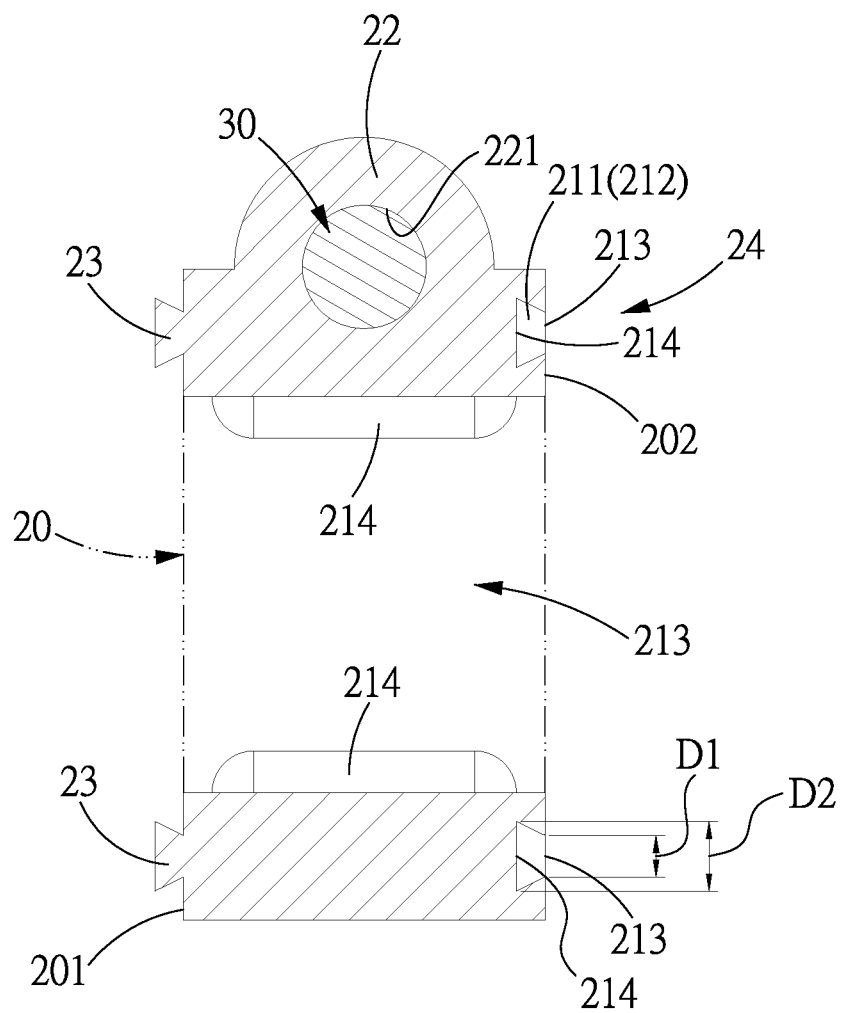
FIG. 4 is a transverse cross sectional view of the nail clamp in accordance with the present invention.
Figure 5:
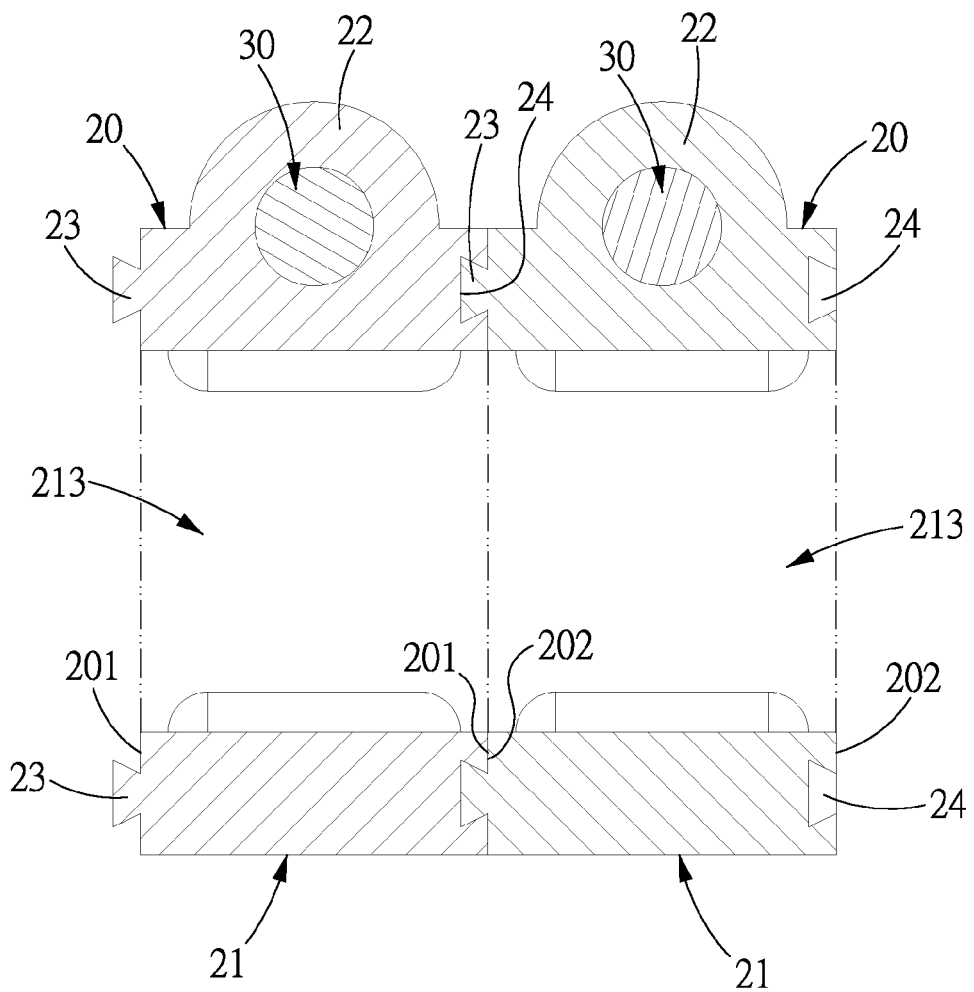
FIG. 5 is a transverse cross sectional view showing that two nail clamps in accordance with the present invention are assembled together.
Figure 6:
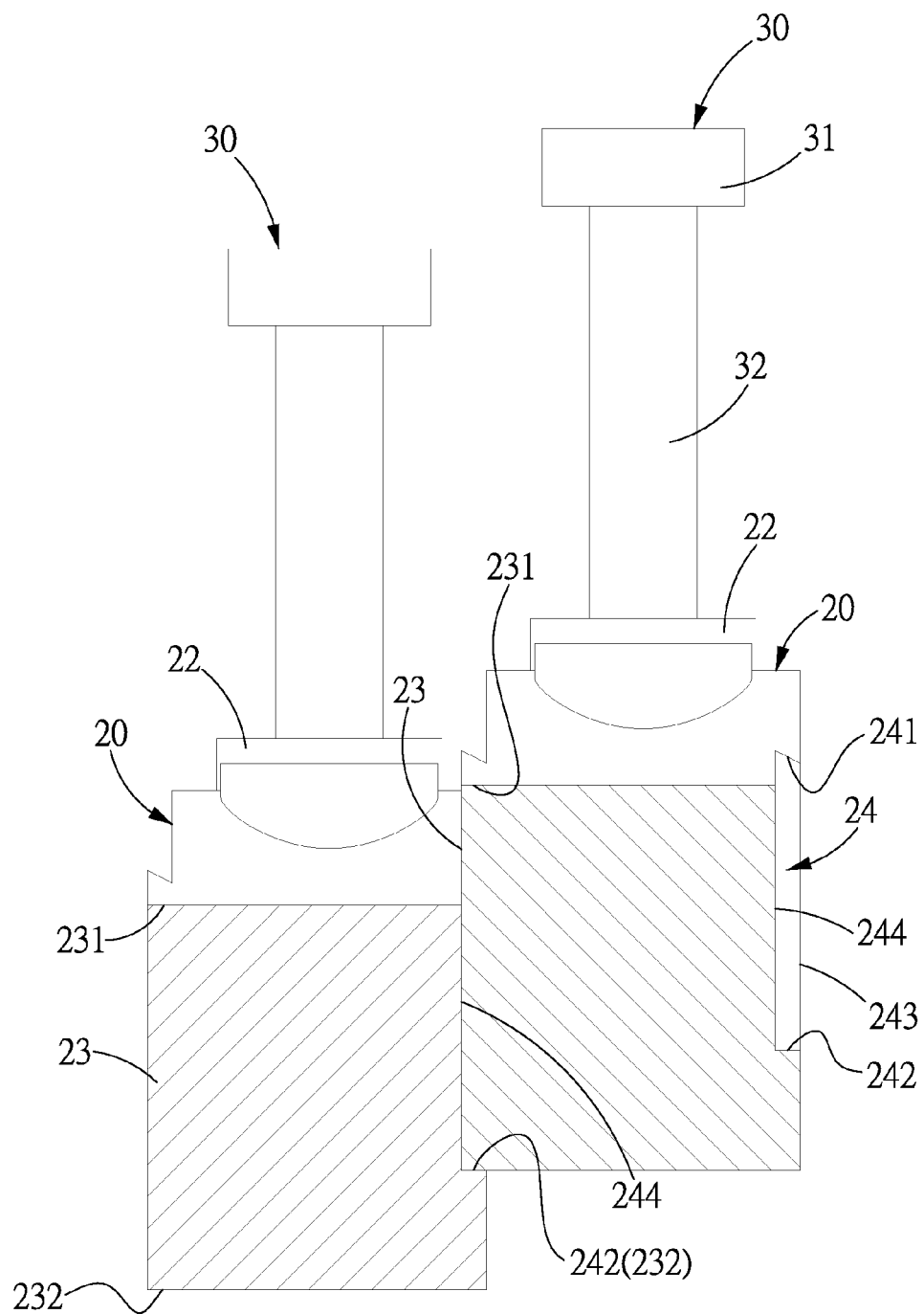
FIG. 6 is a longitudinal cross sectional view showing that two nail clamps in accordance with the present invention are assembled together.

Referring to FIGS. 2 and 3, a connecting structure for the nail clamp in accordance with the present invention is illustrated, wherein the clamp body 20 includes a first side 201 and an opposite second side 202. The first side 201 is provided with at least one rib 23 extending in the direction X, and the second side 202 is provided with at least one engaging groove 24 located corresponding to the rib 23. The rib 23 includes a first end 231 extending to the closed end 211 of the clamp portion 21, and a second end 232 extending to the open end 212 of the clamp portion 21. The engaging groove 24 includes an opening end 241 located at the closed end 211 of the clamp portion 21, and a bottom end 242 located between the closed end 211 and the open end 212 of the clamp portion 21. The engaging groove 24 further includes a top gap 243 and a bottom surface 244 which extend in the direction X, and the engaging groove 24 is dovetailed in such a manner that the top gap 243 has a width D1 smaller than a width D2 of the bottom surface 244, and the rib 23 is formed in the shape of the engaging groove 24. As shown in FIGS. 5 and 6, the second end 232 of the rib 23 of one nail clamp is inserted from the opening end 241 into the engaging groove 24 and stopped against the bottom end 242 of another nail clamp, so that two nail clamps are assembled together in a stepped manner.

Referring then to FIG. 5, the engaging groove 24 of the clamp body 20 is dovetailed, and the rib 23 is correspondingly shaped to fit in the engaging groove 24. The engaging groove 24 and the rib 23 can also be cylindrically shaped. Besides, as shown in FIGS. 2, 3 and 5, the clamp portion 21 of the clamp body 20 defines a U-shaped space 213 for holding the cylindrical object. On the inner surface of the U-shaped space 213 are formed two opposite engaging ribs 214 which are located adjacent to the open end 212 of the clamp portion 21 to further restrict the cylindrical object into the U-shaped space 213.

Figure 7:
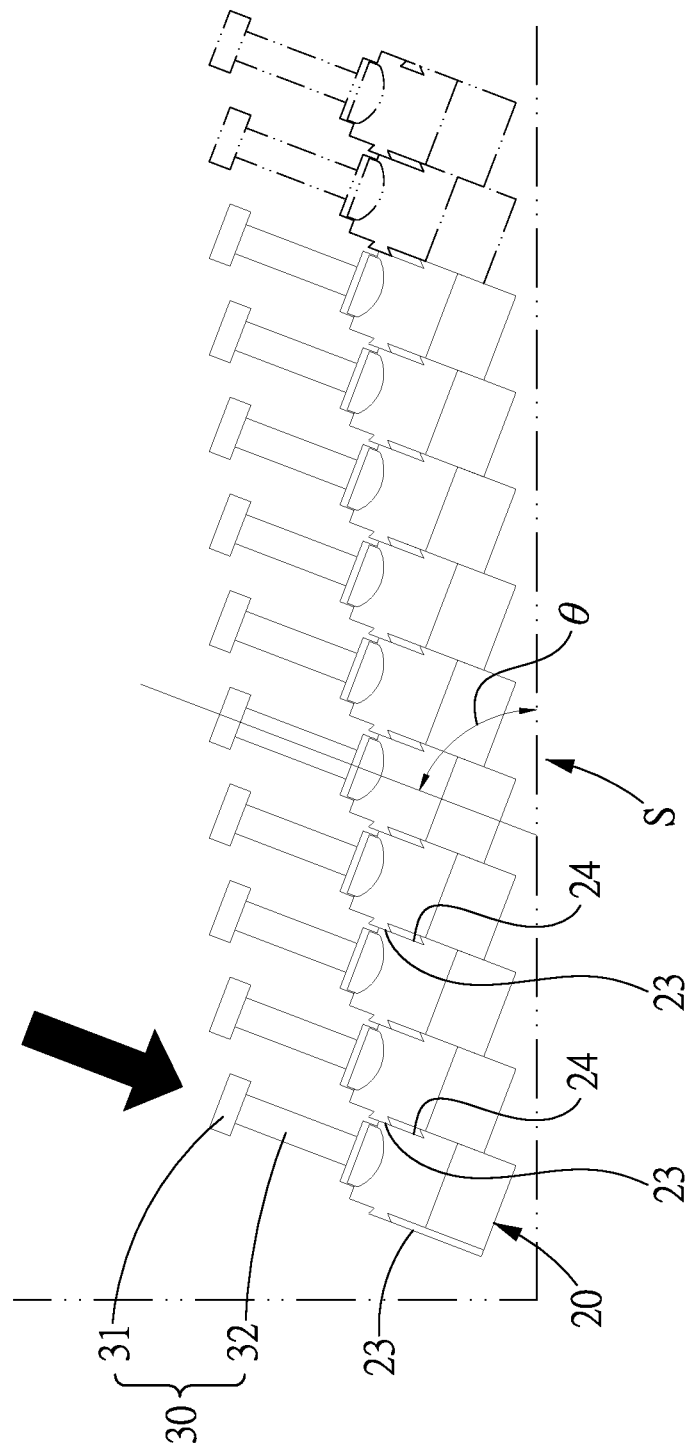
FIG. 7 is a side view showing that a plurality of nail clamps in accordance with the present invention are connected into a strip and positioned against a nailing surface.
Figure 8:
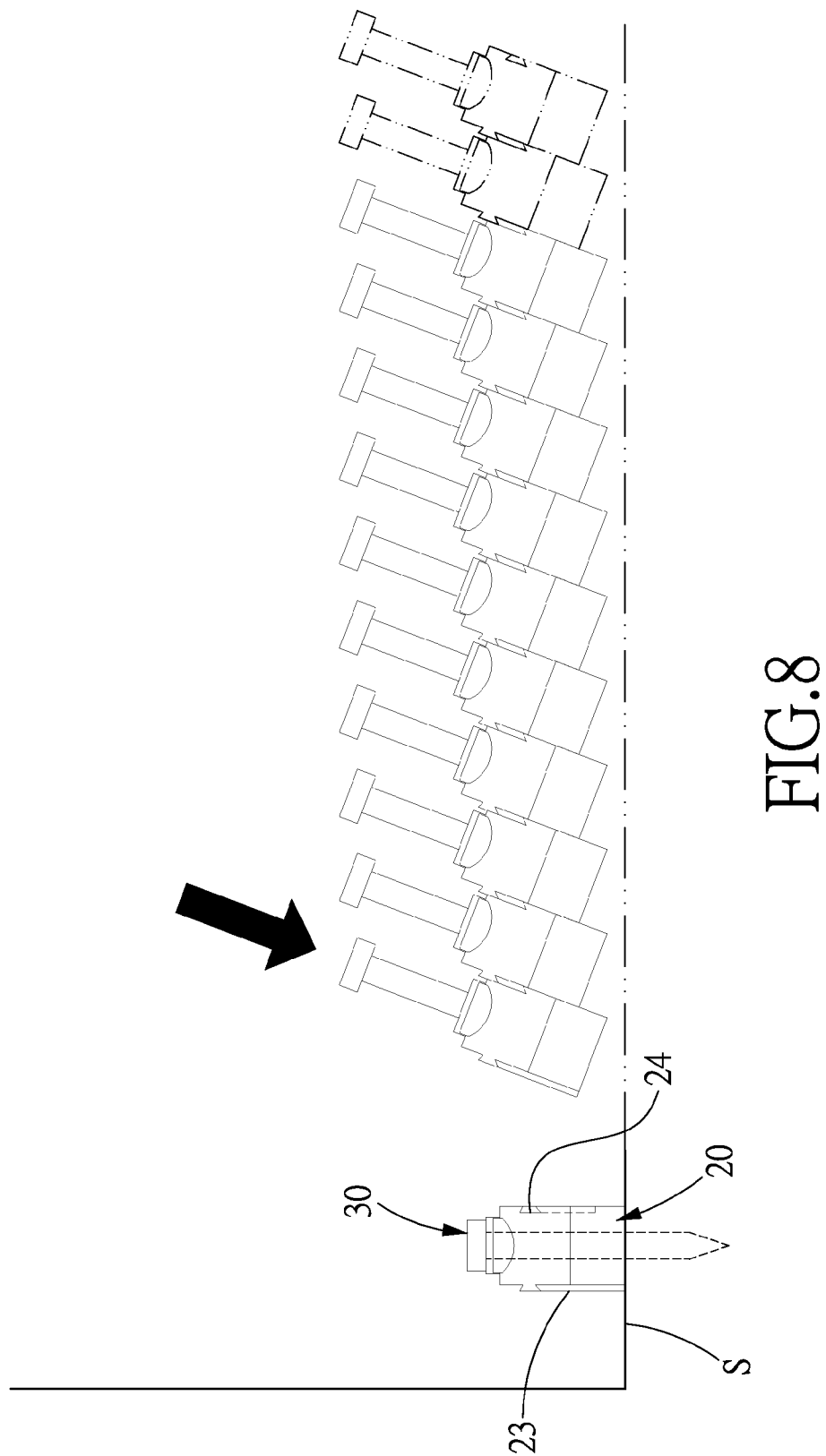
FIG. 8 is a side view showing that a plurality of nail clamps in accordance with the present invention are connected into a strip, and one nail clamp is pushed from the nail clamp strip and fixed to the nailing surface.

What has been mentioned above are the structural relations of the components of the preferred embodiment of the present invention and, for a better understanding of the invention, its operating advantages and the specific objects attained by its uses, reference should be had to FIGS. 7, 8 and the following descriptive matter. The method for using the nail clamp of the present invention comprises the following steps:

inserting the rib 23 of a first nail clamp into the engaging groove 24 of a second nail clamp until the second end of the rib 23 of the first nail clamp is stopped against the bottom end 242 of the second nail clamp, so that a plurality of nail clamps are assembled into a nail clamp strip in a stepped manner;

loading the nail clamp strip into a nail gun in a manner that the open end 212 of the respective nail clamps faces toward (comes into contact with) the nailing surface S where the nail clamps are to be fixed, and the bodies 32 of the nails 30 inside the nail gun are positioned at an angle θ (90<θ<45 degrees) with respect to the nailing surface S where the nail clamps are to be fixed;

using the nail gun to push the nail 30 into the nailing surface S by applying a push force to the head 31 of the nail 30, so that the clamp body 20 is driven to move away from the nail clamp strip and fixed on the nailing surface S by the nail 30.

It is to be noted that the quantity of the rib 23 and engaging groove 24 of the nail clamp of the present invention can be such that there is a rib 23 and an engaging groove 24 formed at two sides of one of the free ends of the U-shaped clamp portion 21 of the clamp body 20, and preferably at the free end adjacent to the insertion portion 22. To ensure that the nail clamps can be firmly assembled together and prevent drift of nail clamp when the nail clamp is being fired, it is preferably that there are two ribs 23 and two engaging grooves 24 at two sides of two free ends of the U-shaped clamp portion 21, as shown in FIGS. 2 and 3.

With the arrangement of the rib 23 and engaging groove 24, a plurality of nail clamps can be connected into a nail clamp strip in a stepped manner, and the nail clamp strip can be used in a framing nail gun. Besides, when the nail 30 is being fired, the position relation between the nail 30 and the nailing surface S is changed to make the head 31 of the nail 30 avoid the walls surrounding the nail clamp, providing sufficient space for operating the nail gun, allowing the nail gun to conveniently fire the body 32 of the nail 30 into the nailing surface S even in a corner.

What is claimed is:

1. A nail clamp for a connecting structure, the nail clamp comprising a clamp body and a nail, the clamp body including a U-shaped clamp portion and an insertion portion with an insertion hole penetrating the insertion portion, a lengthwise direction of the insertion hole of the insertion portion being defined as a direction X, and the clamp portion including a closed end and an open end located in the direction X, the connecting structure being characterized in that:

the clamp body includes a first side and an opposite second side, the first side is provided with at least one rib extending in the direction X, and the second side is provided with at least one engaging groove located corresponding to the rib, the rib includes at least one end extending to the open end of the clamp portion, the engaging groove includes an opening end located at the closed end of the clamp portion, and a bottom end located between the closed end and the open end of the clamp portion, the at least one end of the rib of one said nail clamp can be inserted into the engaging groove and stopped against the bottom end of the engaging groove of another said nail clamp, so that two said nail clamps are connected into a nail clamp strip in a stepped manner;

when the nail clamps of the nail clamp strip are being fired into a nailing surface, the open end of each of the respective nail clamps is brought into contact with the nailing surface, and a body of the nail of each of the respective nail clamps is positioned at an angle which is larger than 45 degrees and smaller than 90 degrees with respect to the nailing surface.

2. The nail clamp for the connecting structure as claimed in claim 1, wherein the rib includes two ends that are a first end extending to the closed end of the clamp portion, and a second end extending to the open end of the clamp portion.

3. The nail clamp for the connecting structure as claimed in claim 1, wherein the engaging groove further includes a top gap and a bottom surface which extend in the direction X, and the top gap has a width smaller than a width of the bottom surface, and the rib is formed in a shape of the engaging groove.

4. The nail clamp for the connecting structure as claimed in claim 1, wherein the engaging groove is dovetailed, and the rib is formed to fit in the engaging groove.

5. The nail clamp for the connecting structure as claimed in claim 1, wherein the clamp portion of the clamp body defines a U-shaped space for holding a cylindrical object, and on an inner surface of the U-shaped space are formed two opposite engaging ribs which are located adjacent to the open end of the clamp portion.

6. The nail clamp for the connecting structure as claimed in claim 1, wherein the clamp body includes a first side and an opposite second side, the first side of the clamp body is provided with two ribs, and the second side of the clamp body is provided with two engaging grooves.

7. A method using the nail clamp connecting structure as claimed in claim 1 comprising the steps of:

inserting a rib of a first nail clamp into an engaging groove of a second nail clamp until the rib of the first nail clamp is stopped against a bottom end of the engaging groove of the second nail clamp, so that a plurality of nail clamps are assembled into the nail clamp strip in a stepped manner;

loading the nail clamp strip into a nail gun in a manner such that the open end of each respective nail clamp faces toward a nailing surface where the nail clamps are to be fixed, and bodies of nails inside the nail gun are positioned at an angle which is larger than 45 degrees and smaller than 90 degrees with respect to the nailing surface; and using the nail gun to push one of the nails into the nailing surface by applying a push force to a head of the one of the nails, so that the clamp body is driven to move away from the nail clamp strip and fixed on the nailing surface by one of the nails.

\* \* \* \* \*